United States Patent
Kim

(10) Patent No.: US 8,390,762 B2
(45) Date of Patent: Mar. 5, 2013

(54) BACK LIGHT UNIT AND LIQUID CRYSTAL DISPLAY DEVICE AND GAME MACHINE INCLUDING THE SAME

(75) Inventor: Yong-beom Kim, Incheon (KR)

(73) Assignee: Tovis Co., Ltd., Incheon (KR)

( * ) Notice: Subject to any disclaimer, the term of this patent is extended or adjusted under 35 U.S.C. 154(b) by 108 days.

(21) Appl. No.: 12/996,976

(22) PCT Filed: Jun. 8, 2009

(86) PCT No.: PCT/KR2009/003058
§ 371 (c)(1),
(2), (4) Date: Dec. 8, 2010

(87) PCT Pub. No.: WO2009/151244
PCT Pub. Date: Dec. 17, 2009

(65) Prior Publication Data
US 2011/0085109 A1   Apr. 14, 2011

(30) Foreign Application Priority Data
Jun. 9, 2008   (KR) .................. 10-2008-0053586

(51) Int. Cl.
*G02F 1/1335* (2006.01)
(52) U.S. Cl. .............. 349/63; 349/64; 349/65
(58) Field of Classification Search .......... 349/63, 349/65; 463/32
See application file for complete search history.

(56) References Cited

U.S. PATENT DOCUMENTS

| 5,099,343 | A  | * | 3/1992 | Margerum et al. | 349/63 |
| 7,027,113 | B2 | * | 4/2006 | Kim et al. | 349/63 |
| 7,220,181 | B2 | * | 5/2007 | Okada | 463/32 |

FOREIGN PATENT DOCUMENTS

| DE | 100 34 484 A1 | 1/2002 |
| EP | 0 693 703 A1 | 1/1996 |
| JP | 2002-49037 | 2/2002 |
| JP | 2002-049037 A | 2/2002 |
| JP | 2005-266387 | 9/2005 |
| JP | 2005-266387 A | 9/2005 |
| KR | 10-2006-0035331 | 4/2006 |
| KR | 2006-0035331 A | 4/2006 |
| KR | 10-2008-0041440 | 5/2008 |
| KR | 2008-0041440 A | 5/2008 |
| WO | WO 2005/045488 A1 | 5/2005 |
| WO | WO 2008/056842 A1 | 5/2008 |

* cited by examiner

*Primary Examiner* — James Dudek
(74) *Attorney, Agent, or Firm* — Rabin & Berdo, P.C.

(57) ABSTRACT

A game machine including: a liquid crystal display including a liquid crystal panel and a back light unit; and at least one reel which is disposed behind the back light unit. The back light unit for a liquid crystal display includes: a pair of light guide plates which are disposed to face each other, transparent electrodes being formed on corresponding predetermined areas of surfaces facing each other of the light guide plates; a polymer dispersed liquid crystal layer which is formed in a space between the light guide plates and is formed by polymer dispersed liquid crystal; and a plurality of light sources respectively disposed at edges of the light guide plates.

11 Claims, 3 Drawing Sheets

BACK LIGHT UNIT AND LIQUID CRYSTAL DISPLAY DEVICE AND GAME MACHINE INCLUDING THE SAME

CROSS-REFERENCE TO RELATED APPLICATION

This application claims priority to and the benefit of Korean Patent Application No. 10-2008-0053586 filed in the Korean Intellectual Property Office on Jun. 9, 2008, the entire contents of which are incorporated herein by reference.

FIELD OF THE INVENTION

The present invention relates to a back light unit and a liquid crystal display and a game machine including the same. More particularly, the present invention relates to a back light unit which can make a predetermined area transparent and a liquid crystal display and a game machine including the same.

BACKGROUND ART

With increase of needs for various games, various game machines have been developed, and as an example, a slot machine which is used for casino game is one of game machines.

A game machine such a slot machine is provided with a plurality of reels on which symbols such as pictures or numbers are displayed, and takes a game rule that a game result is determined by combination of symbols displayed on the reels.

Recently, a liquid crystal display panel is used in a game machine having such a reel, and information for proceeding game or advertisement is displayed on the liquid crystal display panel.

A liquid crystal display panel is disposed in front of the reel, and in this case, symbols displayed on the reel which is disposed behind the liquid crystal display panel can be seen from the front of the liquid crystal display panel. For this function, several methods have been suggested. For example, in Korea Patent Publication No. 10-2007-0055766 (title: game machine having display screen), a light guide plate of a back light unit of a liquid crystal display is made of transparent or translucent material and scratch or dot pattern is not formed on area of the light guide plate corresponding to symbol display area of the reel so that symbols of the reel can be seen from the front of the liquid crystal display through the area where the pattern is not formed, and in Korea Patent Publication No. 10-2006-0049328 (title: game machine), area of a diffuse sheet, a light guide plate, and a reflector of a back light unit corresponding to symbol display area of the reel is removed and thus symbols of the reel can be seen from the front of the liquid crystal display.

However, a method suggested in Korea Patent Publication No. 10-2007-0055766 has a problem in that the area of the light guide plate on which scratch or dot pattern is not formed may deteriorate the function of uniform light penetration of the light guide plate so as to deteriorate light efficiency of the back light unit. And, a method suggested in Korea Patent Publication No. 10-2006-0049328 has a problem in that images cannot be displayed on openings existed in the diffuse sheet, a light guide plate and a reflector and images cannot be displayed on the openings when game using the reel is not performed.

Technical Problem

The present invention has been made in an effort to provide a back light unit which can convert a predetermined area to a transparent state, and a liquid crystal display and a game machine including the same.

Technical Solution

An exemplary embodiment of the present invention provides a back light unit for a liquid crystal display including: a pair of light guide plates which are disposed to face each other, transparent electrodes being formed on corresponding predetermined areas of surfaces facing each other of the light guide plates; a polymer dispersed liquid crystal layer which is formed in a space between the light guide plates and is formed by polymer dispersed liquid crystal; and a plurality of light sources respectively disposed at edges of the light guide plates.

A pattern may not be formed on surfaces of the light guide plates.

The back light unit may further include a light switch plate which is disposed behind the light source module, a light source member which can be selectively converted into a transparent state being disposed at an area corresponding to the predetermined area of the light switch plate, and the other area of the light switch plate being made of nontransparent material.

The light switch member may be a TN liquid crystal panel which can be selectively converted into a transparent state.

An exemplary embodiment of the present invention provides a liquid crystal display including: the above-described back light unit; and a liquid crystal panel disposed in front of the pair of the light guide plates.

An exemplary embodiment of the present invention provides a game machine including: a liquid crystal display including a liquid crystal panel and a back light unit disposed behind the liquid crystal panel; and at least one reel which is disposed behind the back light unit and on which a plurality of symbols are disposed. The back light unit for a liquid crystal display includes: a pair of light guide plates which are disposed to face each other, transparent electrodes being formed on corresponding predetermined areas of surfaces facing each other of the light guide plates; a polymer dispersed liquid crystal layer which is formed in a space between the light guide plates and is formed by polymer dispersed liquid crystal; and a plurality of light sources respectively disposed at edges of the light guide plates.

A pattern may not be formed on surfaces of the light guide plates.

The back light unit may further include a light switch plate which is disposed behind the light source module, a light source member which can be selectively converted into a transparent state being disposed at an area corresponding to the predetermined area of the light switch plate, and the other area of the light switch plate being made of nontransparent material.

The light switch member may be a TN liquid crystal panel which can be selectively converted into a transparent state.

According to another embodiment of the present invention, a game machine may further include an auxiliary light source disposed behind an area of the reel where a symbol is displayed.

Advantages Effects

According to the present invention, since a polymer dispersed liquid crystal layer is formed between a pair of light guide plates edges of which a light source is provided, and transparent electrodes are formed at predetermined areas of the light guide plates contacting the polymer dispersed liquid crystal layer, the polymer dispersed liquid crystal layer may be turned to be transparent by applying voltage to the transparent electrodes and accordingly things behind the predetermined area can be seen from the front of the back light unit. At this time, the polymer dispersed liquid crystal layer also performs the function of diffusing light emitted from the light source, so a conventional nontransparent diffuse plate can be omitted.

In addition, a back light unit is disposed behind the light source module and a light source member which can be selectively converted into a transparent state is disposed at an area corresponding to the predetermined area of the light switch plate, and the other area of the light switch plate is made of nontransparent material, so the predetermined area can be selectively transparent and at the same time an area except the predetermined area is nontransparent so that things behind the area except the predetermined area cannot be seen.

Since a game machine is provided with a liquid crystal display including the above-stated back light unit, in case that voltage is applied to the transparent electrodes contacting the polymer dispersed liquid crystal layer, the selected symbol of the reel can be seen from the front of the game machine through the predetermined area, and on the other hand, in case that voltage is not applied to the transparent electrodes, the whole image display area of the liquid crystal display of the game machine can be used at a normal liquid crystal display.

In addition, by making the light switch member transparent, the selected symbol of the reel can be seen from the front of the game machine through the transparent electrodes provided to the light guide plates and the light switch member. At this time, since an area of the light switch plate except the light switch member is not transparent, things behind the area except the predetermined area can be prevented from being unnecessarily seen from the front of the game machine.

BRIEF DESCRIPTIONS OF DRAWINGS

Figure 1:
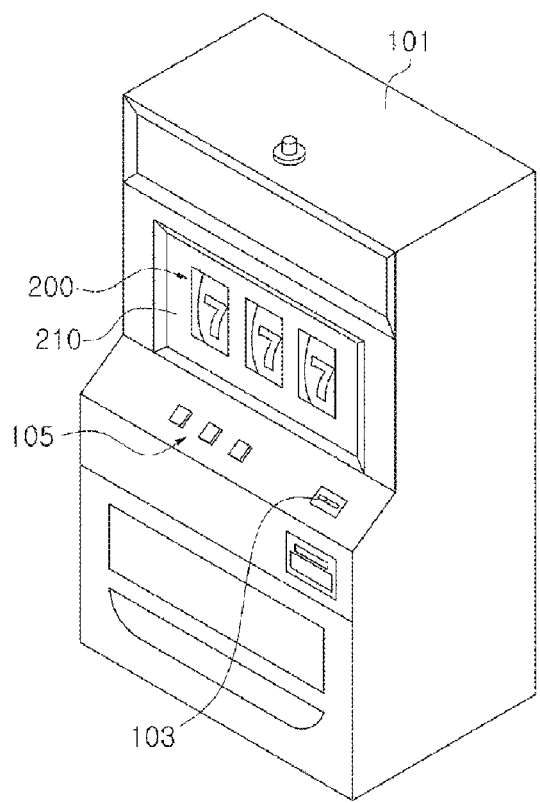
FIG. 1 is a perspective view of a game machine according to an exemplary embodiment of the present invention.

<Description of reference numerals for main parts of drawings>

| | |
|---|---|
| 200: liquid crystal display | 210: liquid crystal panel |
| 220: back light unit | 221: polymer dispersed liquid crystal |
| 223, 225: light guide plate | 231, 233: light source |
| 300: reel | 301: reel drum |
| 303: reel strip | 305: symbol |
| 307: auxiliary light source | |

DETAILED DESCRIPTION OF THE EMBODIMENTS

Embodiments of the present invention will now be described hereinafter with reference to the accompanying drawings.

In the drawings, the thickness of layers, films, panels, regions, etc. are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

Since a back light unit according to an embodiment of the present invention and a liquid crystal display including a back light unit according to an embodiment of the present invention are included in a game machine according to an embodiment of the present invention, separate descriptions for a back light unit according to an embodiment of the present invention and a liquid crystal display including a back light unit according to an embodiment of the present invention are omitted.

Figure 2:
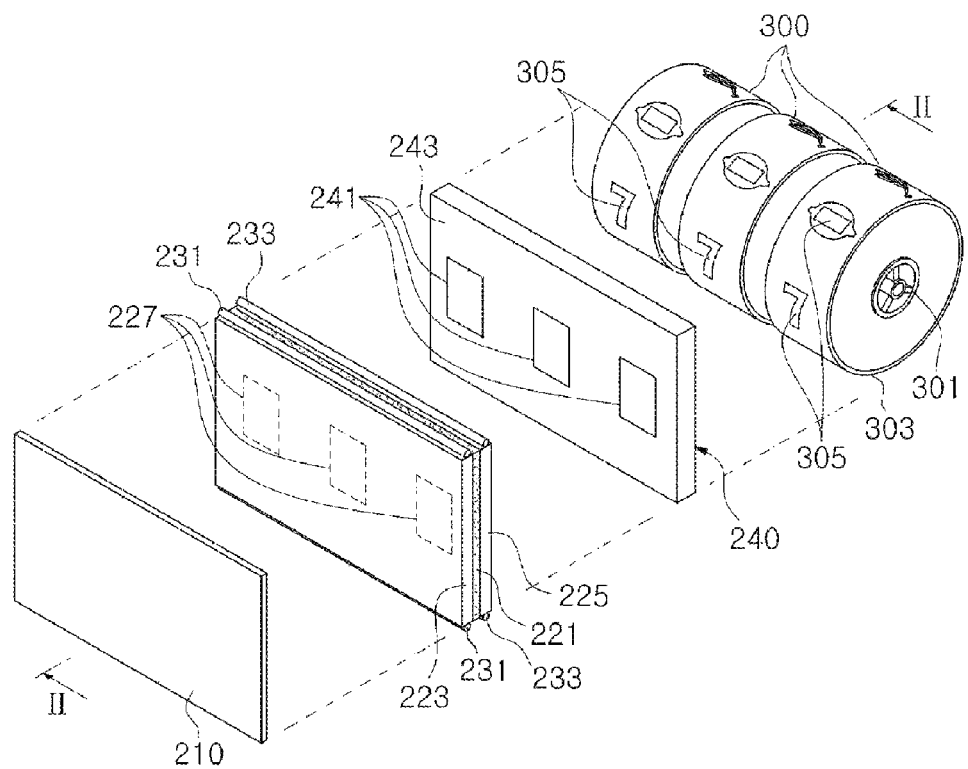
FIG. 2 is an exploded perspective view of a liquid crystal display and a reel of a game machine according to an exemplary embodiment of the present invention.
Figure 3:
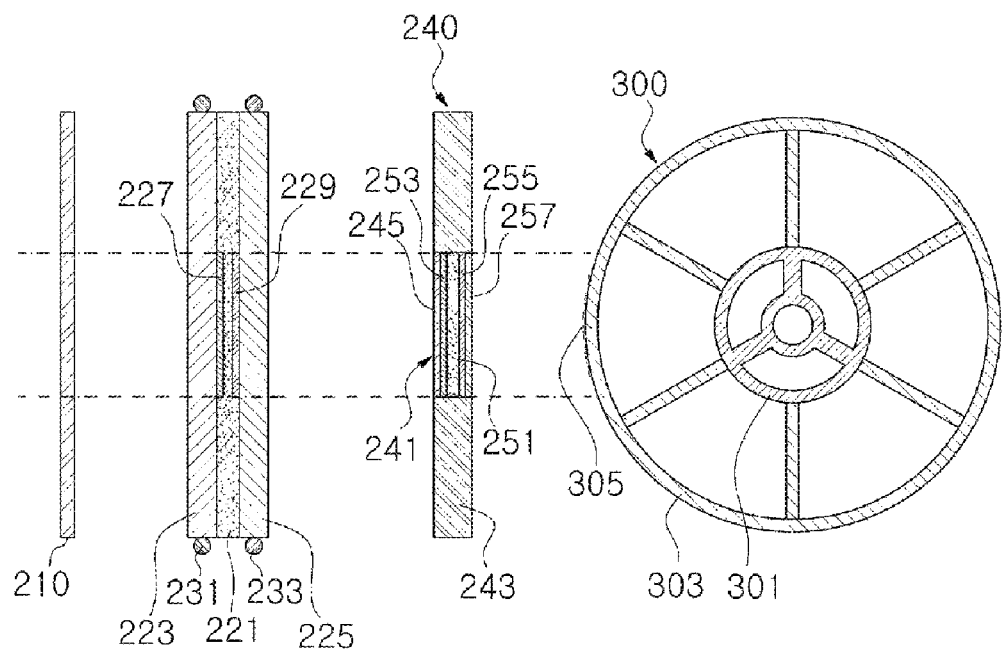
FIG. 3 is a sectional view taken along a line II-II in FIG. 2.
Figure 4:
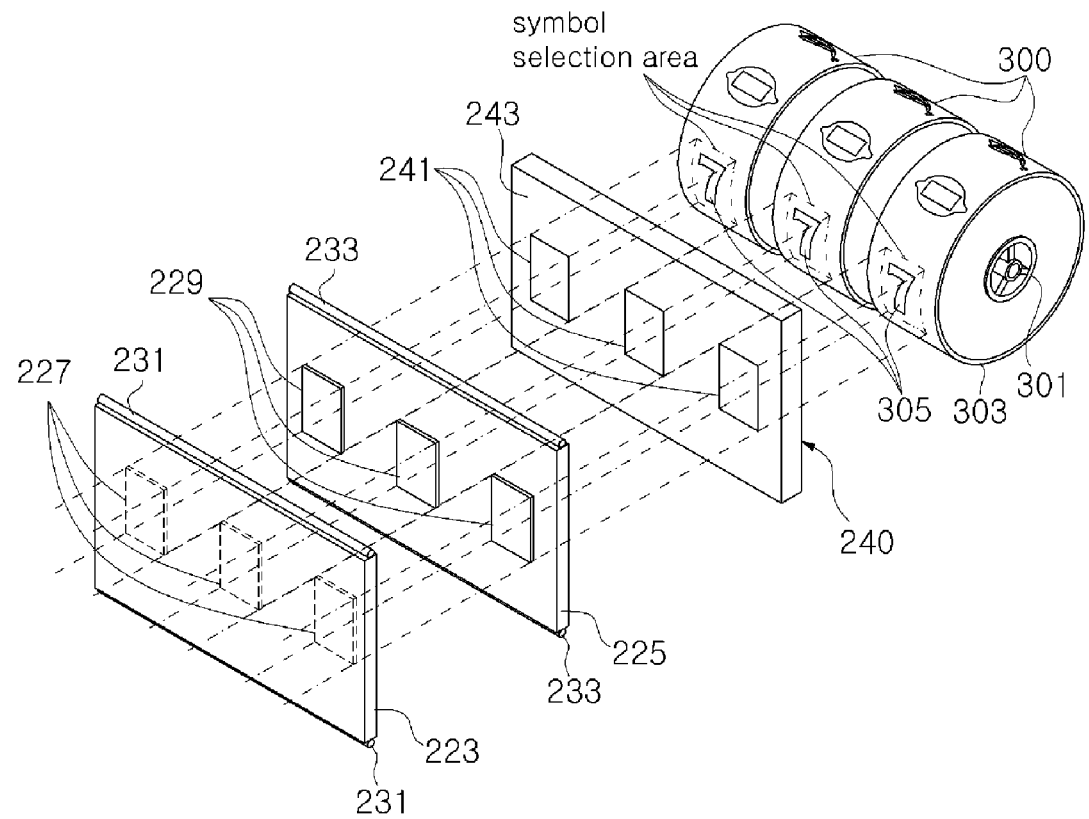
FIG. 4 is a drawing for explaining position relation of a pair of light guide plates and a light switch plate of a back light unit of a liquid crystal display and a symbol selection area of a reel of a game machine according to an exemplary embodiment of the present invention.
Figure 5:
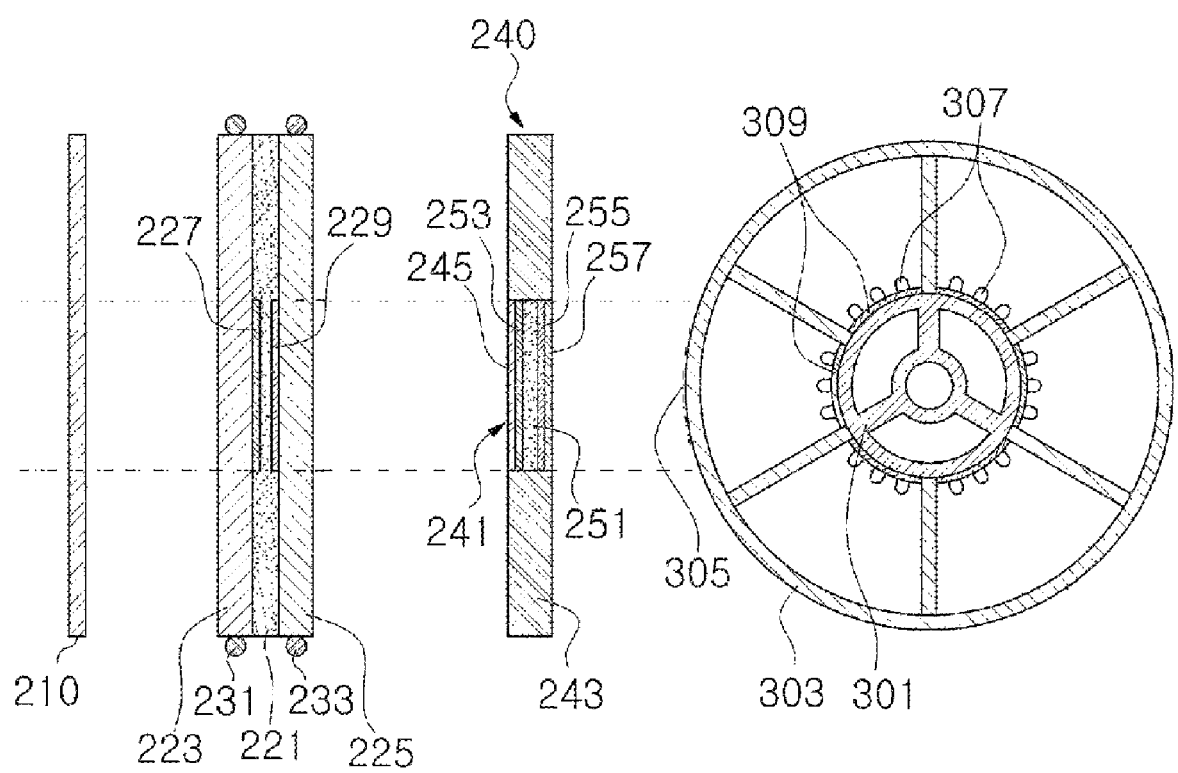
FIG. 5 is a sectional view of a liquid crystal display and a reel of a game machine according to another exemplary embodiment of the present invention.

FIG. 1 is a perspective view of a game machine according to an exemplary embodiment of the present invention, FIG. 2 is an exploded perspective view of a liquid crystal display and a reel of a game machine according to an exemplary embodiment of the present invention, FIG. 3 is a sectional view taken along a line II-II in FIG. 2, FIG. 4 is a drawing for explaining position relation of a pair of light guide plates and a light switch plate of a back light unit of a liquid crystal display and a symbol selection area of a reel of a game machine according to an exemplary embodiment of the present invention, and FIG. 5 is a sectional view of a liquid crystal display and a reel of a game machine according to another exemplary embodiment of the present invention.

Referring to FIG. 1, a game machine according to an embodiment of the present invention is provided with a body 101 of a cabinet shape, and various parts and controllers for game is housed in body 101.

Various parts which are necessary for performing game, e.g., an insert hole 103 for insertion of coin, various input buttons 105 or the like, may be provided or formed to body 101.

As shown in FIG. 2 to FIG. 4, a game machine includes a liquid crystal display 200 which is a display device for displaying images, and a reel 300 which is disposed behind liquid crystal display 200.

Liquid crystal display 200 includes a liquid crystal panel 210 and a back light unit 220.

Liquid crystal display 200, as shown in FIG. 1, is installed to body 101 of a game machine such that a front surface of liquid crystal panel 210 is exposed to outside. Accordingly, liquid crystal display 200 roles as an image display of a game machine and can display various images such as information or images for performing game and advertisements.

Liquid crystal display 200 according to an embodiment of the present invention operates to display desired images on the whole image display area of liquid crystal panel 210 or to convert a predetermined area among the whole image display area to be transparent or translucent. At this time, "transparent" or "translucent" means that an object or image behind the same can be seen in front, and "transparent or translucent" is simply written as "transparent".

The predetermined area is an area corresponding to a symbol selection area where the selected symbol of reel 300 disposed behind liquid crystal display 200 is disposed, and in case that the predetermined area is turned to be transparent, a symbol (e.g., a figure, a number, a picture or the like) displayed in the symbol selection area of reel 300 disposed behind liquid crystal display 200 can be seen from the front of liquid crystal display 200.

In case that liquid crystal display 200 operates such the predetermined area becomes transparent, a symbol displayed on reel 300 can be seen from the front of a game machine through the predetermined area, so a game using the symbol displayed on reel 300 can be performed. At this time, liquid crystal display 200 operates such that a symbol of reel 300 can be seen through the predetermined area, and at the same time, may display other information or images necessary for a game or other information or images on an image display area other than the predetermined area.

On the other hand, in case that liquid crystal display 200 operates such that the predetermined area is not transparent (for example, displaying an image on the whole image display area), liquid crystal display 200 may operate as a normal display device, i.e., operate to display an image on the whole image display area while preventing a symbol of the reel from being seen from the front.

A back light unit, and a liquid crystal display for realizing this function according to an embodiment of the present invention and a game machine including the same will be described in detail hereinafter.

Referring to FIG. 2 to FIG. 4, liquid crystal display 200 includes liquid crystal panel 210 and back light unit 220 which are disposed back and forth side by side.

Liquid crystal panel 210 may be a conventional transparent liquid crystal panel, and for example, may be formed by sealing liquid crystal in a space formed between two facing transparent panels such as a glass panel on which thin film transistors are formed. At this time, a basic display mode of liquid crystal panel 210 may be set as a normally white. "Normally white" means that a white display state (light can penetrate toward a display surface, i.e., light penetrating through a display surface can be from the outside) is realized while a liquid crystal panel is not operated.

Back light unit 220 acts as a light source of liquid crystal display 200 and is disposed behind liquid crystal panel 210.

Meanwhile, not shown in the drawing, liquid crystal display 200 may further include a chassis including various frames and holders for assembling liquid crystal panel 210 and back light unit 220. In addition, liquid crystal display 200 may further include well known various parts such as a driving circuit for driving liquid crystal panel 210, etc. Gap between liquid crystal panel 210 and back light unit 220 is enlarged for ease of description, but both may contact each other and may be disposed with a small gap.

Back light unit 220 includes a polymer dispersed liquid crystal layer 221 which is formed of polymer dispersed liquid crystal (PDLC).

PDLC is one of liquid crystal cell which can be used in a liquid crystal display (LCD) and regulates penetration of light depending on light scattering intensity. There are some types of PDLC, for example, it may be formed by scattering liquid crystal particles of several μm into polymer, or by containing liquid crystal into net type polymer. Alignment of liquid crystal of PDLC becomes irregular when voltage is not applied thereto and light scattering occurs on a surface having different refractive index from medium, and on the other hand, if voltage is applied to PDLC, directions of liquid crystal molecules becomes uniform so that light can penetrate therethrough.

Polymer dispersed liquid crystal layer 221 is formed in a space between a pair of light guide plates 223 and 225 facing each other. That is, as shown in the drawing, a pair of light guide plates 223 and 225 are arranged to contact both sides of polymer dispersed liquid crystal layer 221 respectively.

For example, by arranging a pair of light guide plates 223 and 225 to face each other and sealing PDLC in a space therebetween, a pair of light guide plates 223 and 225 and polymer dispersed liquid crystal layer 221 disposed therebetween may be formed. Although structure for sealing polymer dispersed liquid crystal layer 221 is not shown in the drawing, such a structure is obvious to a person in the art, so detailed description for the same will be omitted.

Light guide plates 223 and 225 may be formed of transparent material through which light can penetrate, e.g., may be made of acrylic resin.

At this time, a pattern may not be formed on the surface of light guide plates 223 and 225. Since a pattern is not formed on the light guide plates 223 and 225, transparency of light guide plates 223 and 225 are enhanced and accordingly the symbol of reel 300 can be more brightly seen.

Meanwhile, transparent electrodes 227 and 229 are formed respectively on facing surfaces of a pair of light guide plates 223 and 225. That is, transparent electrodes 227 and 229 are formed respectively on surfaces of a pair of light guide plates 223 and 225 contacting polymer dispersed liquid crystal layer 221.

Transparent electrodes 227 and 229 may be made of material which is transparent and has electrical conductivity, and for example, may be made of ITO (Indium Tin Oxide) which is generally used as a transparent electrode of a liquid crystal panel.

At this time, transparent electrodes 227 and 229 are formed on predetermined areas of surfaces of light guide plates 223 and 225 contacting polymer dispersed liquid crystal layer 221. At this time, the predetermined areas are areas corresponding to a symbol selection area where selected area of reel 300 disposed behind liquid crystal display 200 is disposed. That is, a plurality of symbols are displayed on an outer surface of reel 300 and when rotating reel 300 stops, a symbol which is disposed at the front side of reel 300 is the selected symbol, and transparent electrodes 227 and 229 are formed on areas corresponding to an area where the selected symbol of reel 300 is disposed, i.e., corresponding to a symbol selection area. At this time, transparent electrodes 227 and 229 may be formed with size and shape substantially identical with the symbol selection area. Accordingly, when seeing from the front of liquid crystal display 200, transparent electrodes 227 and 229 and an area where the selected symbol is displayed, i.e., the symbol selection area are overlapped in a back and forth direction.

Meanwhile, not shown in the drawing, transparent electrodes 227 and 229 are connected to the outside electrical power source so as to be applied by voltage, and liquid crystal display 200 may include an electrical circuit for controlling to selectively apply voltage to transparent electrodes 227 and 229.

Light sources 231 and 233 are provided on edges of light guide plates 223 and 225.

Light source 233 may be realized as an arbitrary device which can emit light such as a cathode ray lamp and LED lamp. For example, as shown in the drawing, light sources 231 and 233 may be a bar-shaped lamp, and the bar-shaped lamp may be disposed at least one edge of light guide plates 223 and 225. Although in the drawing it is illustrated that light sources 231 and 233 are disposed at upper edges and lower edges of light guide plate 233 and 235 respectively, light source may be disposed at only one of the upper edge and the lower edge of the light guide plate and may be disposed at least one of a left edge or a right edge of the light guide plate.

Polymer dispersed liquid crystal layer 221 which is formed between light guide plates 223 and 225 diffuses light emitted from light source module 230 to make more uniform. Since light is diffused by polymer dispersed liquid crystal layer 221 and then goes forward, luminance becomes more uniform and view angle becomes greater.

Meanwhile, according to another embodiment of the present invention, a light switch plate 240 which is interposed between light source module 230 and reel 300 may be further provided.

A predetermined area of light switch plate 240 may be formed to be selectively converted to a light penetration area, and the remained area thereof is made of non-transparent material.

At this time, the predetermined area of light switch plate 240 is an area corresponding to an area occupied by transparent electrodes 227 and 229 which are formed in light guide plates 223 and 225.

As shown in the drawing, light switch plate 240 may include a light switch member 241 which is disposed at an area corresponding to an area of transparent electrodes 227 and 229, and a non-transparent portion 243 occupying the remained area.

Accordingly, seeing from the front of liquid crystal display 200, transparent electrodes 227 and 229 formed in light guide plates 223 and 225, light switch member 241 disposed at the predetermined area of light switch plate 240, and the symbol selection area of reel 300 are overlapped in a back and forth direction.

Light switch member 241 may be realized as a device which can be selectively converted into one of a transparent state a non-transparent state, and for example, may be realized as a liquid crystal panel including a liquid crystal layer which can be selectively converted from a non-transparent state to a transparent state. In particular, light switch member 241 may be realized as a TN liquid crystal panel including TN liquid crystal layer which is made of liquid crystal operating in a TN (Twisted Nematic) type. Since TN type has a low optical penetration ratio, light switch member 241 made of TN liquid crystal panel can effectively hide in a non-transparent state the reel 300 behind. Hereinafter, a case that light switch member 241 is TN liquid crystal panel is exemplarily described.

For example, TN liquid crystal panel 241 may include transparent plates 245 and 257 which are made of transparent material and disposed to face each other, and a TN liquid layer 251 which is formed in a space between transparent plates 245 and 257, and transparent electrodes 253 and 255 are respectively formed on surfaces of transparent plates 245 and 257 contacting TN liquid crystal layer 251.

For example, transparent plates 245 and 257 may be made of arbitrary transparent material such as transparent synthetic resin, transparent glass, or the like, and TN liquid crystal layer 251 may be formed by sealing liquid crystal in a space between transparent plates 245 and 257.

Transparent electrodes 253 and 257 may be made of material which is transparent and has electrical conductivity, and for example, may be made of ITO (Indium Tin Oxide) which is generally used as a transparent electrode of a liquid crystal panel.

Non-transparent portion 243 of light switch plate 240 may be arbitrary non-transparent material such as non-transparent synthetic resin.

For example, by applying voltage to transparent electrodes 253 and 255 contacting liquid crystal layer 251 so as to convert TN liquid layer 251 into a transparent state, TN liquid crystal panel 241 can become a transparent state having light penetration characteristic. In this way, TN liquid crystal panel 241 can selectively become a transparent state, so TN liquid crystal panel 241 can act as a light switch.

Reel 300 is housed within body 101 of a game machine so as to be disposed behind liquid crystal display 200. Reel 300 may be provided as a plural, respective reel 300 may be disposed adjacently in parallel. Respective reel 300 may be formed to rotate independently.

For example, reel 300 may include a reel drum 301 and a reel strip 303 which is attached to an outer surface of reel drum 301. And a motor (not shown) for rotating reel drum 301 may be provided.

For example, reel strip 303 may be made of translucent resin.

A plurality of symbols 305 may be displayed on an outer surface of reel strip 303, and respective symbol 305 may be equidistantly disposed with some interval therebetween. At this time, the symbol may be a number, a picture, a letter, etc. Hereinafter, an area of reel strip 303 where the symbol is displayed is referred to as a symbol display area. That is, respective reel 300 has symbol display area of the same number with the number of symbols 305 displayed on an outer surface thereof.

Respective reel 300 may rotate and stop at a state that the symbol display area where the symbol is displayed is positioned at a front center. Hereinafter, an imaginary area corresponding to a front center at which the symbol display area where the symbol 305 is displayed stops is referred to as the symbol selection area.

As shown in FIG. 3 and FIG. 4, an area occupied by transparent electrodes 227 and 229 which is formed in a pair of light guide plates 223 and 225 and an area occupied by light switch member 241 of light switch plate 240, i.e., TN liquid crystal panel 241 are disposed at a position corresponding to the symbol selection area.

That is, a number, a position, a size, and a shape of transparent electrodes 227 and 229 which is formed in light guide plates 223 and 225 corresponds to a number, a position, a size, and a shape of the symbol selection area. Similarly, a number, a position, a size, and a shape of TN liquid crystal panel 241 of light switch plate 240 corresponds to a number, a position, a size, and a shape of the symbol selection area of reel 300. For example, as shown in the drawing, three reels 300 are arranged in a horizontal direction, transparent electrodes 227 and 229 and TN liquid crystal panel 241 are provided as three respectively, and have a position and a shape corresponding to a position and a shape of the symbol selection area.

If voltage is applied to transparent electrodes 227 and 229, a portion of polymer dispersed liquid crystal layer 221 which is interposed between transparent electrodes 227 and 229 becomes a light penetration state, i.e., a transparent state by the characteristic of PDLC as described above. Accordingly, the selected symbol which is disposed on the symbol selection area of reel 300 behind transparent electrodes 227 and 229 can be seen from the front of liquid crystal display 200.

At this time, a portion of liquid crystal panel 210 corresponding to an area where transparent electrodes 227 and 229 are positioned is controlled to be normally white state, so the selected symbol of reel 300 can be seen from the front of liquid crystal display 200 through an area where transparent electrodes 227 and 229 of back light unit 220 are positioned and the corresponding area of liquid crystal panel 210.

In addition, in case that light switch plate 240 is further provided, so as to make polymer dispersed liquid crystal layer 221 and TN liquid crystal layer 241 which correspond to the symbol selection area of reel 300 transparent respectively, voltage is respectively applied to transparent electrodes 227 and 229 contacting polymer dispersed liquid crystal layer 221 and transparent electrodes 253 and 255 contacting TN liquid crystal layer 251, and thereby the selected symbol positioned at the symbol selection area of reel 300 can be seen from the front of a game machine.

A game machine according to another embodiment of the present invention will be described with reference to FIG. 5.

According to another embodiment of the present invention, an auxiliary light source 307 is disposed behind the symbol display area where symbol 305 of reel 300 is displayed. For example, referring FIG. 5, auxiliary light source 307 may be mounted on a mount 309 which is disposed behind the symbol display area where symbol 305 is displayed. Auxiliary light source 307 may be an arbitrary light source emitting light such as an LED lamp.

In this case, by applying voltage to transparent electrodes 227 and 229 so that an area corresponding to transparent electrodes 227 and 229 becomes a transparent viewable area, and accordingly, the selected symbol 305 of reel 300 can be from the front of a game machine. In particular, at this time, by turning on light source 307 disposed behind the symbol display area of reel 300, the symbol displayed on the selected symbol display area can be further brightly seen.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Industrial Applicability

The present invention relates to a back light unit, and a liquid crystal display and a game machine including the same, so has an industrial applicability.

What is claimed is:

1. A back light unit for a liquid crystal display, comprising:
a pair of light guide plates which are disposed to face each other;
transparent electrodes formed on corresponding predetermined areas of surfaces facing each other of the light guide plates;
a polymer dispersed liquid crystal layer formed in a space between the light guide plates and comprising polymer dispersed liquid crystal;
a plurality of light sources respectively disposed at edges of the light guide plates; and
a light switch plate disposed behind the light sources, and including a light switch member disposed at an area corresponding to the predetermined area of the light guide plates and which can be selective converted into a transparent state, and the other area of the light switch plate being made of nontransparent material.

2. The back light unit of claim 1, wherein a pattern is not formed on surfaces of the light guide plates.

3. The back light unit of claim 1, wherein the light switch member is a TN liquid crystal panel which can be selectively converted into a transparent state.

4. A liquid crystal display, comprising:
a back light unit, including:
a pair of light guide plates which are disposed to face each other;
transparent electrodes formed on corresponding predetermined areas of surfaces facing each other of the light guide plates;
a polymer dispersed liquid crystal layer formed in a space between the light guide plates and comprising polymer dispersed liquid crystal; and
a plurality of light sources respectively disposed at edges of the light guide plates, and
a liquid crystal panel disposed in front of the pair of the light guide plates of the back light unit.

5. A game machine comprising:
a liquid crystal display including a liquid crystal panel and a back light unit disposed behind the liquid crystal panel; and
at least one reel which is disposed behind the back light unit and on which a plurality of symbols are disposed,
wherein the back light unit comprises:
a pair of light guide plates which are disposed to face each other, transparent electrodes being formed on corresponding predetermined areas of surfaces facing each other of the light guide plates;
a polymer dispersed liquid crystal layer which is formed in a space between the light guide plates and is formed by polymer dispersed liquid crystal; and
a plurality of light sources respectively disposed at edges of the light guide plates.

6. The game machine of claim 5, wherein a pattern is not formed on surfaces of the light guide plates.

7. The game machine of claim 5, further comprising a light switch plate which is disposed behind the light source module, a light source member which can be selectively converted into a transparent state being disposed at an area corresponding to the predetermined area of the light switch plate, and the other area of the light switch plate being made of nontransparent material.

8. The game machine unit of claim 7, wherein the light switch member is a TN liquid crystal panel which can be selectively converted into a transparent state.

9. The game machine of claim 5, further comprising an auxiliary light source disposed behind an area of the reel where a symbol is displayed.

10. A liquid crystal display, comprising:
a back light unit of claim 1; and
a liquid crystal panel disposed in front of the pair of the light guide plates of the back light unit.

11. A liquid crystal display comprising:
a back light unit of claim 3; and
a liquid crystal panel disposed in front of the pair of the light guide plates of the back light unit.

* * * * *